(12) United States Patent
Li

(10) Patent No.: US 10,795,093 B2
(45) Date of Patent: Oct. 6, 2020

(54) OPTICAL FIBER CONNECTOR

(71) Applicant: Shenzhen Fibercan Optical Co., Ltd, Guangdong (CN)

(72) Inventor: Yaole Li, Guangdong (CN)

( * ) Notice: Subject to any disclaimer, the term of this patent is extended or adjusted under 35 U.S.C. 154(b) by 0 days.

(21) Appl. No.: 16/492,956

(22) PCT Filed: Dec. 27, 2017

(86) PCT No.: PCT/CN2017/118823
§ 371 (c)(1),
(2) Date: Sep. 11, 2019

(87) PCT Pub. No.: WO2019/114035
PCT Pub. Date: Jun. 20, 2019

(65) Prior Publication Data
US 2020/0018907 A1    Jan. 16, 2020

(30) Foreign Application Priority Data

Dec. 13, 2017    (CN) .......................... 2017 1 1327425

(51) Int. Cl.
*G02B 6/38*    (2006.01)

(52) U.S. Cl.
CPC ......... *G02B 6/3857* (2013.01); *G02B 6/3849* (2013.01)

(58) Field of Classification Search
CPC .. G02B 6/3857; G02B 6/3849; G02B 6/3821; G02B 6/3893; G02B 6/3869; G02B 6/3866; G02B 6/387
See application file for complete search history.

(56) References Cited

U.S. PATENT DOCUMENTS

| | | | |
|---|---|---|---|
| 6,916,120 B2 * | 7/2005 | Zimmel | G02B 6/3843 385/78 |
| 8,221,007 B2 * | 7/2012 | Peterhans | G02B 6/3893 385/53 |
| 8,931,963 B2 * | 1/2015 | Scopic | G02B 6/3887 385/78 |
| 10,495,824 B2 * | 12/2019 | Rosson | G02B 6/3826 |
| 2017/0343745 A1 * | 11/2017 | Rosson | G02B 6/3874 |

FOREIGN PATENT DOCUMENTS

WO    WO-2014008657 A1 *    1/2014    .......... G02B 6/3849

* cited by examiner

*Primary Examiner* — Ryan A Lepisto
(74) *Attorney, Agent, or Firm* — Prakash Nama; Global IP Services, PLLC

(57) ABSTRACT

An optical fiber connector allowing more precise connection, having a front casing and an insertion core assembly; the front casing has an installation hole where the insertion core assembly is installed; the insertion core assembly has an insertion core and a tail rod; the tail rod has a tail rod head portion and a tail rod necking portion; the tail rod head portion fixedly sleeves one end of the insertion core; the tail rod head portion has a quadrilateral cross section; a cross section of the installation hole also has a quadrilateral shape that matches the quadrilateral cross section of the tail rod head portion.

7 Claims, 7 Drawing Sheets

OPTICAL FIBER CONNECTOR

BACKGROUND OF THE INVENTION

The present invention relates to the technical field of optical fiber connector, and more specifically relates to high precision optical fiber connector.

In the prior arts, an insertion core in an optical fiber connector is movable along an axial direction of the optical fiber connector, and may rotate by a certain degree when it is compressed axially. However, these characteristics greatly affect the experimental data of the tests on the optical fiber connector. When testing the optical fiber connector, test results may deviate if the insertion core can rotate by a certain degree, and this greatly affects the test data obtained, therefore it is difficult to meet the requirement for repeatability of the test. Hence, minimizing a degree of rotation of the insertion core of the optical fiber connector when the insertion core is compressed is now an urgent issue that requires a solution. Further, after the optical fiber connector is inserted to an adaptor, external force possibly exists at a back side of the optical fiber connector may affect the connection of the optical fiber connector with the adaptor, and minimizing such impact to the connection is also an urgent issue that requires a solution.

BRIEF SUMMARY OF THE INVENTION

An object of the present invention is to provide a high precision optical fiber connector, which minimizes a degree of rotation of the insertion core of the optical fiber connector when the insertion core retracts, while not affecting the movement of the insertion core, so as to increase the precision of the optical fiber connector and minimize the impact of external force at the back end of the optical fiber connector on the quality of connection between the optical fiber connector and its adaptor after the optical fiber connector is inserted into and connects with the adaptor.

The technical solutions provided by the present invention are detailed as follows:

An optical fiber connector, comprising a front casing and an insertion core assembly; the front casing comprises an installation hole where the insertion core assembly is installed; the insertion core assembly comprises an insertion core and a tail rod; the tail rod comprises a tail rod head portion and a tail rod necking portion; the tail rod head portion fixedly sleeves one end of the insertion core: the tail rod head portion has a quadrilateral cross section; a cross section of the installation hole also has a quadrilateral shape that matches the quadrilateral cross section of the tail rod head portion.

Further, a surface of the tail rod head portion facing towards the insertion core from back to front of the insertion core is a curved surface; an inner side wall of the installation hole is projected inwardly to form a curved hole having an inner surface that has a curved shape that matches the curved surface of the tail rod head portion, so that after the insertion core has passed through the curved hole, the tail rod is blocked by the curved hole.

Further, the optical fiber connector also comprises a rear casing connected with the front casing; the rear casing comprises a hollow aluminum press tube and a connecting rod that fixedly sleeves one end of the hollow aluminum press tube; the connecting rod is provided with a projected portion.

Further, the connecting rod is provided with a fastener; the front casing is provided with a lock opening; when the connecting rod is inserted into the front casing, the fastener locks into the lock opening, so as to fix the front casing and the rear casing.

Further, the optical fiber connector also comprise a sleeve tube that sleeves the tail rod necking portion, and a spring that sleeves the sleeve tube; one end of the spring abuts against the tail rod head portion, another end of the spring abuts against the hollow aluminum press tube.

Further, an inner side wail of an end of the sleeve tube connecting with the tail rod necking portion is provided with a projection; the tail rod necking portion is provided with a recessed portion; the projection is embedded to the recessed portion so as to fix the sleeve tube with respect to the tail rod necking portion.

Further, the optical fiber connector also comprises a tail sleeve and a crimp ring; the crimp ring sleeves the hollow aluminum press tube of the rear casing and the optical fiber; the tail sleeve sleeves the crimp ring and the optical fiber.

Further, a hollow rivet is provided inside the crimp ring; the hollow rivet has a through hole running through a rivet body and a rivet cap; a fiber core of the optical fiber passes through the hollow rivet from the rivet body; a periphery of the rivet cap of the hollow rivet presses against a jacket of the optical fiber so as to fix the optical fiber.

Further, the optical fiber connector also comprises an intermediate panel; a head portion of the tail sleeve is provided with a position limiting groove; the intermediate panel is provided with a protrusion corresponding to the position limiting groove and a position limiting portion corresponding to the projected portion on the connecting rod of the rear casing, so that when the intermediate panel clamps the tail sleeve and the rear casing, the intermediate panel fixes the tail sleeve and the rear casing.

Further, the optical fiber connector also comprises a dust proof cap inserted into the front casing; the dust proof cap comprises a cap body, a first necking portion and a second necking portion; a cavity is provided running through the first necking portion and the second necking portion; a plurality of ribs are dispersed on the second necking portion; when the dust proof cap is inserted into the front casing, a step platform between the first necking portion and the second necking portion abuts against a front end of the front casing, the insertion core extends into the cavity.

Compared with the prior arts, the optical fiber connector of the present invention has modified the tail rod head portion of the insertion core assembly from a hexagonal shape to a quadrilateral shape, which greatly reduces the degree of rotation of the insertion core when the insertion core assembly retracts backwardly after the insertion core assembly is inserted into the front casing, thereby greatly increasing the precision and repeatability of such insertion connection. The curved surface of the part of the tail rod head portion connecting the insertion core and the curved hole provided in the installation hole of the front casing matching the curved surface provide guiding effect when the insertion core rebounds after compression, thus ensuring that the insertion core rebounds along the same position, thereby minimizing the rotational shift of the insertion core after rebound and therefore reducing the impact of external force on the quality of connection and hence increasing the stability of the optical fiber connector and the precision of connection. Structurally, a rear casing according to the prior art is divided into two separate components in the present invention, namely the rear casing and the intermediate panel, and such modification shortens a total length of the optical fiber connector by shortening the length of the rear casing while not affecting the properties and performance of the optical fiber connector, so that the optical fiber connector is more securely fixed to its corresponding adaptor.

DETAILED DESCRIPTION OF THE INVENTION

In order that the objects, technical solutions and advantages of the present invention are more clearly understood, the present invention will be described further in detail below with reference to an embodiment and the figures. It should be understood that, the embodiment as will be described is only intended to illustrate the present invention and is not intended to limit the present invention.

The present invention will be further described in detail below.

Figure 1:
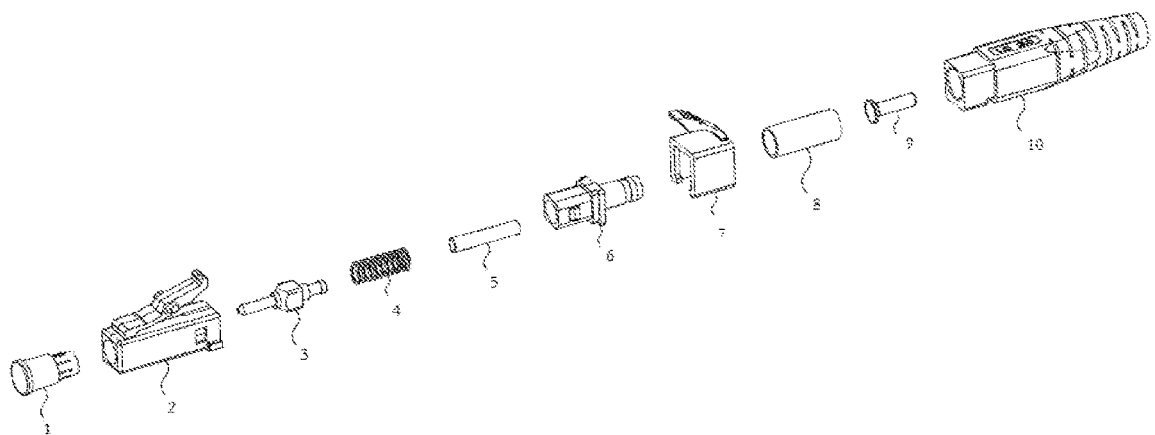
FIG. 1 is an exploded structural view of the optical fiber connector according to the present invention.
Figure 2:
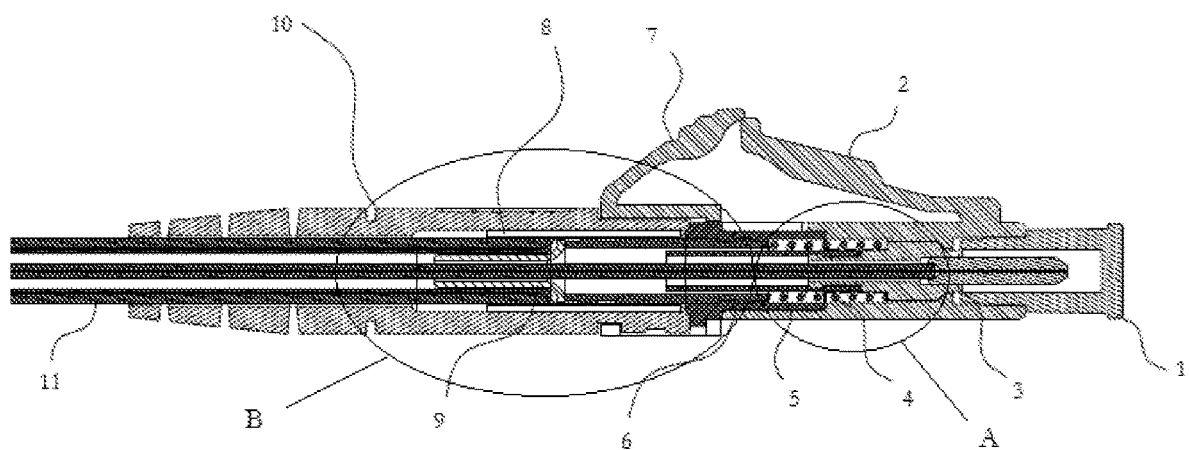
FIG. 2 is a sectional view of the optical fiber connector according to the present invention.

As shown in FIGS. 1-2, an optical fiber connector according to an embodiment of the present invention comprises a dust proof cap 1, a front casing 2, an insertion core assembly 3, a spring 4, a sleeve tube 5, a rear casing 6, an intermediate panel 7, a crimp ring 8, a hollow rivet 9 and a tail sleeve 10. The dust proof cap 1 is inserted into one end of the front casing 2; the rear casing 6 is inserted into another end of the front casing 2; the insertion core assembly 3, the spring 4 and the sleeve tube 5 are disposed inside a cavity formed by the front casing 2 and the rear casing 6; the tail sleeve 10 sleeves the rear casing 6; the intermediate panel 7 clamps onto the tail sleeve 10 and the rear casing 6; the crimp ring 8 and the hollow rivet 9 are pressed against the rear casing 6; an optical fiber 11 penetrates through the tail sleeve 10, the rear casing 6, and up into the insertion core assembly 3.

Figure 3:
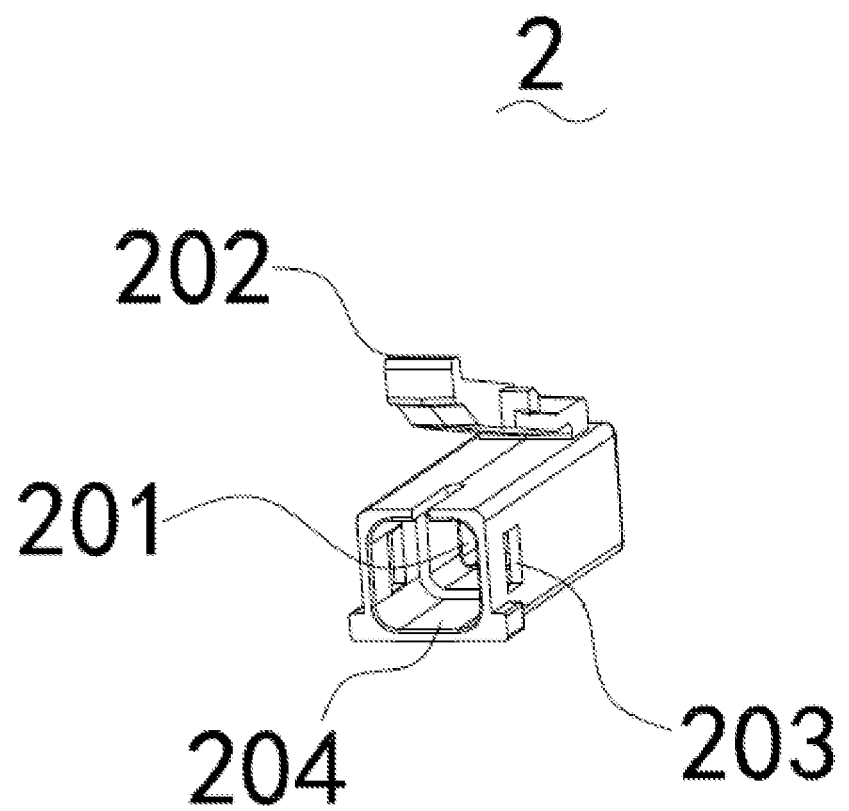
FIG. 3 is a perspective structural view of the front casing of the optical fiber connector according to the present invention.
Figure 4:
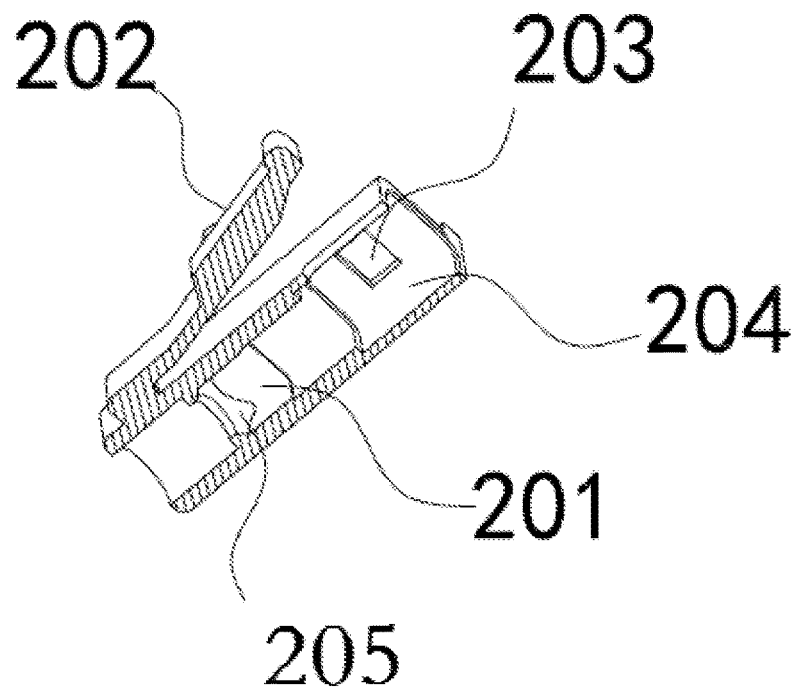
FIG. 4 is a sectional view of the front casing of the optical fiber connector according to the present invention.
Figure 5:
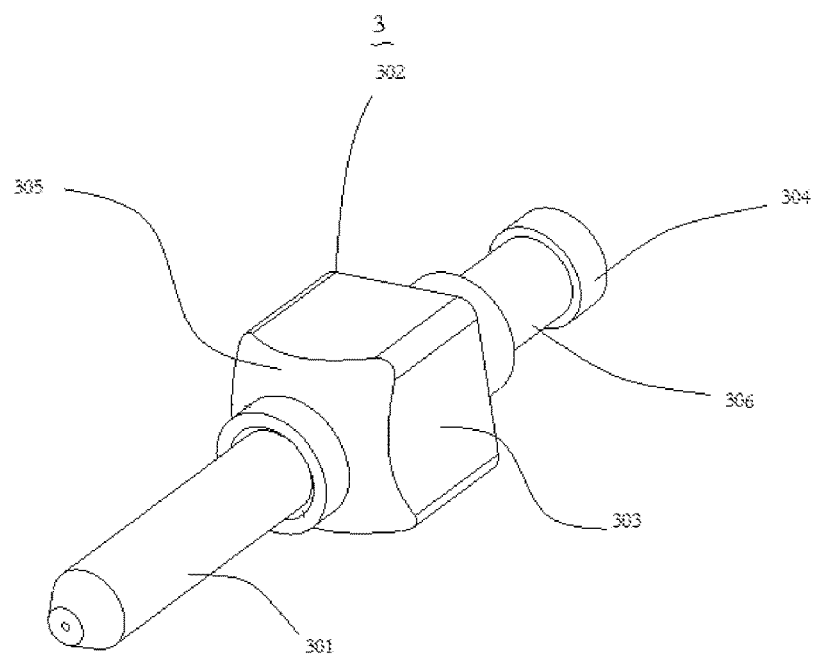
FIG. 5 is a perspective structural view of the optical fiber connector according to the present invention.

As shown in FIGS. 3-5, the front casing 2 comprises an installation hole 201 where the insertion core assembly 3 is installed, and a rear hole 204 that connects with the rear casing 6; the front casing 2 is also provided with a resilient piece 202 and a lock opening 203; the insertion core assembly 3 comprises an insertion core 301 and a tail rod 302 that fixedly sleeves one end of the insertion core 301; the tail rod 302 comprises a tail rod head portion 303 and a tail rod necking portion 304; the tail rod head portion 303 has a quadrilateral cross section; a cross section of the installation hole 201 also has a quadrilateral shape that matches the quadrilateral cross section of the tail rod head portion 303; a surface of the tail rod head portion 303 facing towards the insertion core 301 from back to front of the insertion core 301 is a curved surface 305; the tail rod necking portion 304 is provided with a recessed portion 306; an inner side wall of the installation hole 201 is projected inwardly to form a curved hole 205 having an inner surface that has a curved shape that matches the curved surface 305 of the tail rod head portion 303, so that after the insertion core 301 has passed through the curved hole 205, the tail rod 302 is blocked by the curved hole 205.

Figure 6:
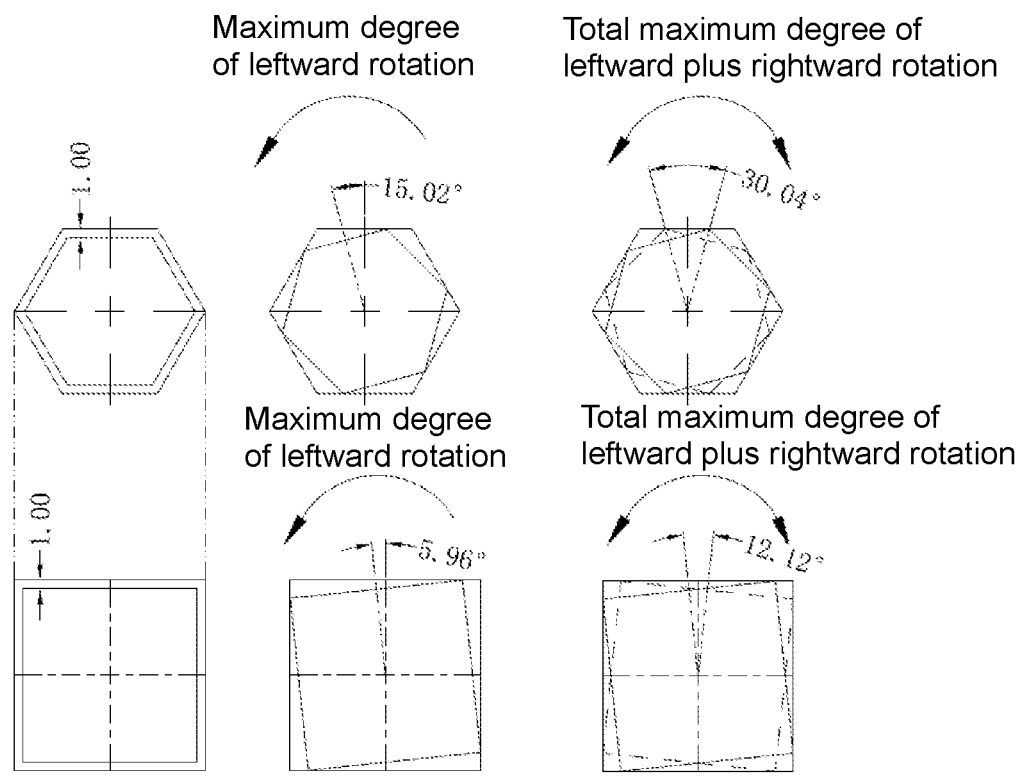
FIG. 6 is a comparison with respect to degree of rotation in insertion connection using quadrilateral components and in insertion connection using hexagonal components.

With reference to FIG. 6, given that an outer dimension is the same and a spacing distance is the same, insertion connection that involves quadrilateral components will result in much less degree of rotation of the inserted component compared with insertion connection that involves hexagonal components. Since the tail rod head portion 303 has the quadrilateral cross section, while the cross section of the installation hole 201 also has the quadrilateral shape that matches the quadrilateral cross section of the tail rod head portion 303, degree of rotation is greatly reduced when the insertion core assembly 3 retracts backwardly after the insertion core assembly 3 is inserted into the front casing 2, thereby greatly increasing the precision and repeatability of such insertion connection.

Figure 7:
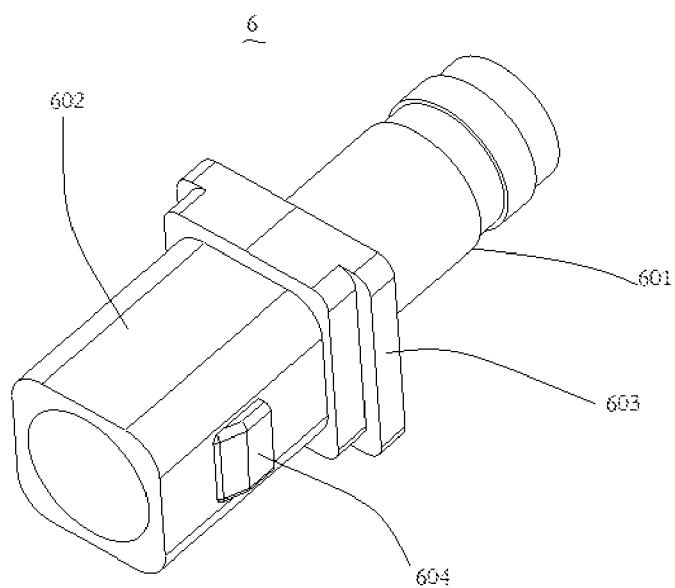
FIG. 7 is a perspective structural view of the rear casing of the optical fiber connector of the present invention.
Figure 8:
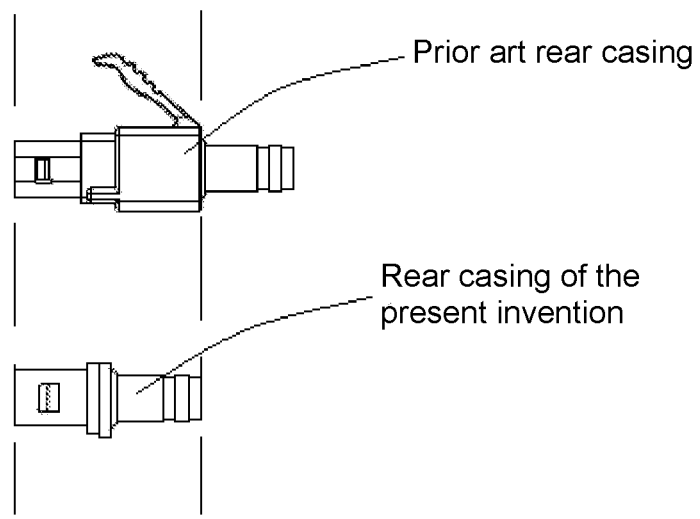
FIG. 8 is a comparison between a prior art rear casing and the rear casing of the present invention.

With reference to FIGS. 7-8, the rear casing 6 and the intermediate panel 7 of the present invention are modified from the rear casing 6 according to the prior arts; the rear casing 6 comprises a hollow aluminum press tube 601 and a connecting rod 602 that fixedly sleeves one end of the hollow aluminum press tube 601; the connecting rod 602 is provided with a projected portion 603 and a fastener 604; when the connecting rod 602 is inserted into the rear hole 204 of the front casing 2, the fastener 604 locks into the lock opening 203 of the front casing 2, so as to fix the front casing 2 and the rear casing 6. Structurally, the present invention has modified the press strip portion of an existing rear casing according to the prior art by dividing it into two separate components, namely the rear casing 6 and the intermediate panel 7 of the present invention, and such modification shortens a total length of the optical fiber connector by shortening the length of the rear casing while not affecting the properties and performance of the optical fiber connector, so that the optical fiber connector is more securely fixed to its corresponding adaptor.

Figure 9:
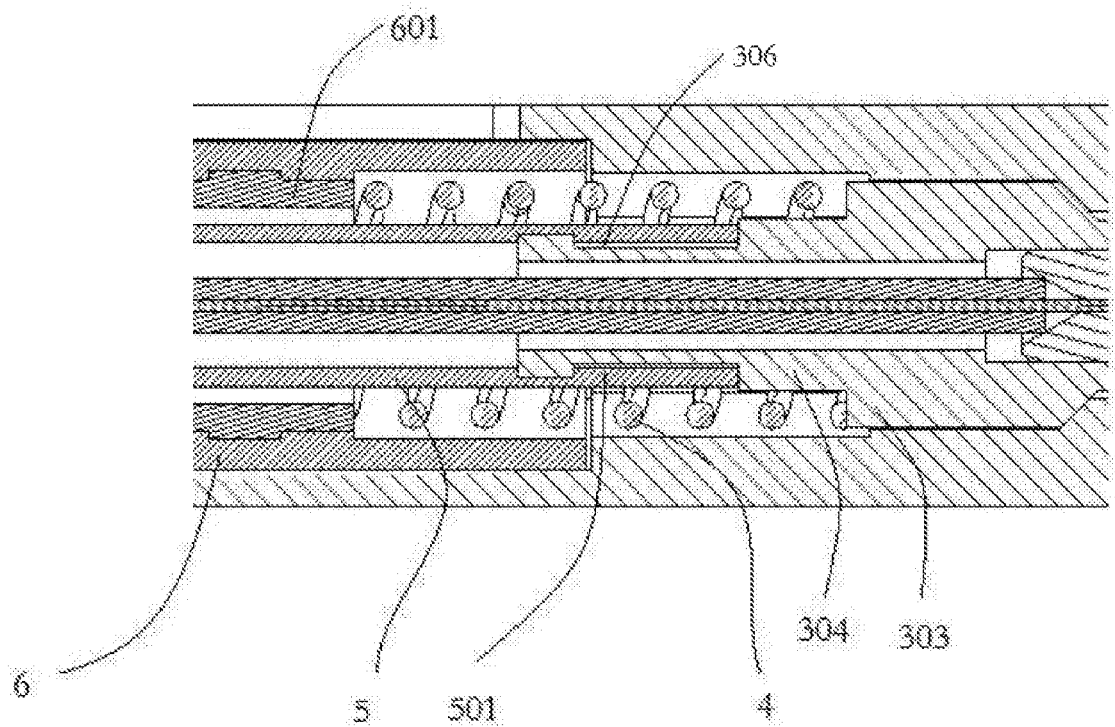
FIG. 9 is the enlarged portion A of FIG. 2.

With reference to FIG. 9, the sleeve tube 5 sleeves the tail rod necking portion 304, the spring 4 sleeves the sleeve tube 5; one end of the spring 4 abuts against the tail rod head portion 303, another end of the spring 4 abuts against the hollow aluminum press tube 601; an inner side wall of an end of the sleeve tube 5 connecting with the tail rod necking portion 304 is provided with a projection 501; the projection 501 is embedded to the recessed portion 306 of the tail rod necking portion 304, so as to fix the sleeve tube 5 with respect to the tail rod necking portion 304.

Figure 10:
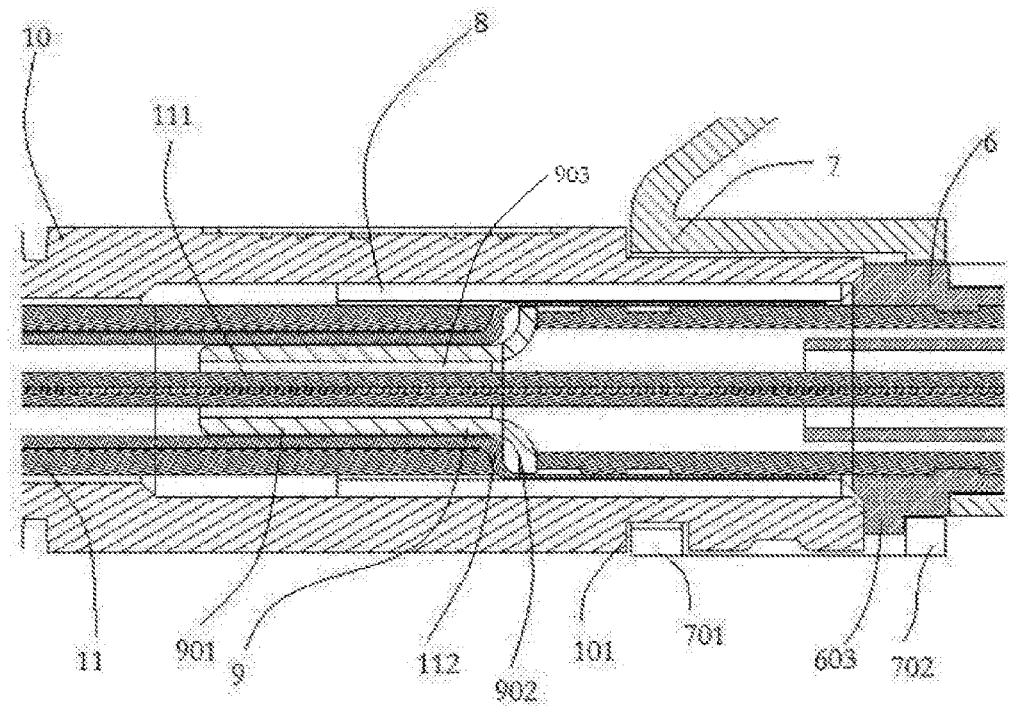
FIG. 10 is the enlarged portion B of FIG. 2.

With reference to FIG. 10, the crimp ring 8 sleeves the hollow aluminum press tube 601 of the rear casing 6 and the optical fiber 11; the tail sleeve 10 sleeves the crimp ring 8 and the optical fiber 11; the hollow rivet 9 is disposed inside the crimp ring 8; the hollow rivet 9 has a through hole 903 running through the rivet body 901 and a rivet cap 902; a fiber core 111 of the optical fiber 11 passes through the hollow rivet from the rivet body 901; a periphery of the rivet cap 902 of the hollow rivet 9 presses against a jacket 112 of the optical fiber 11 so as to fix the optical fiber 11; a head portion of the tail sleeve 10 is provided with a position limiting groove 101; the intermediate panel 7 is provided with a protrusion 701 corresponding to the position limiting groove 101 and a position limiting portion 702 corresponding to the projected portion 603 on the connecting rod 602 of the rear casing 6, so that when the intermediate panel 7 clamps the tail sleeve 10 and the rear casing 6, the intermediate panel 7 fixes the tail sleeve 10 and the rear casing 6.

Figure 11:
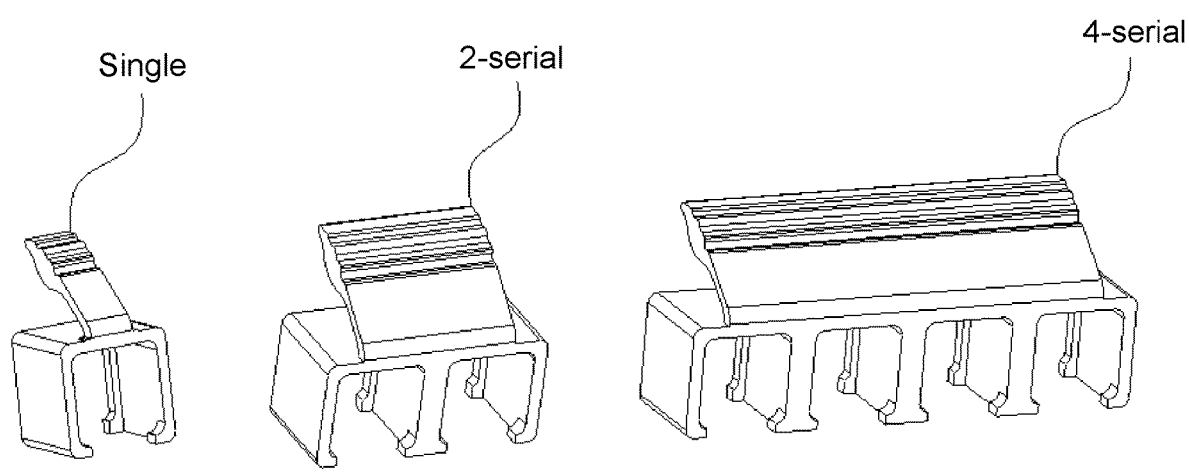
FIG. 11 is the perspective structural views of different types of intermediate panel.

As shown in FIG. 11 the intermediate panel 7 can be single or multi-serial.

Figure 12:
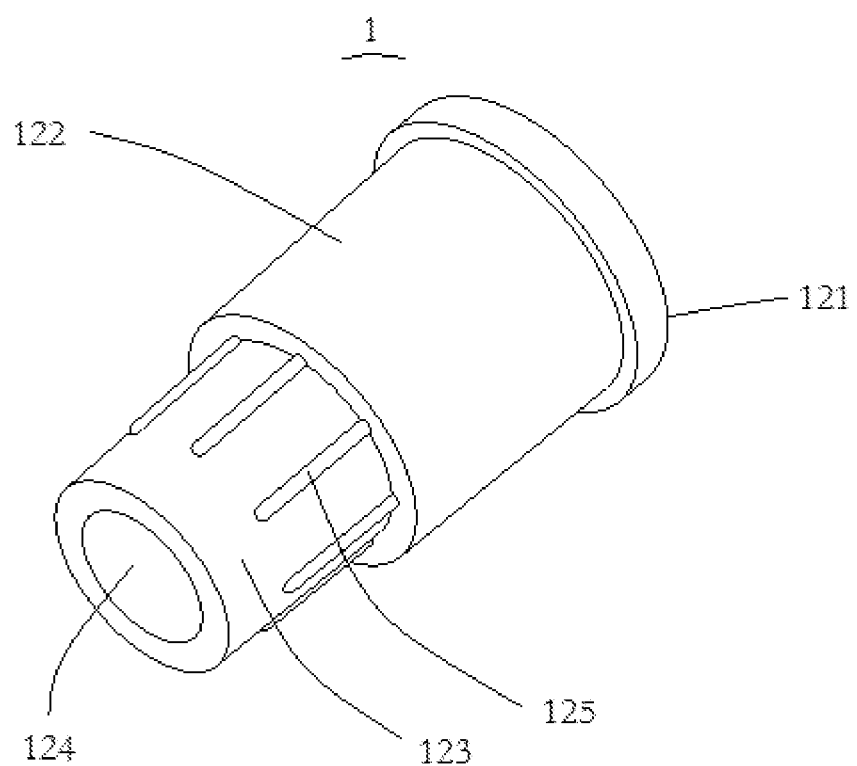
FIG. 12 is the perspective structural view of the dust proof cap of the present invention.

As shown in FIG. 12, the dust proof cap 1 comprises a cap body 121, a first necking portion 122 and a second necking portion 123; a cavity 124 is provided running through the first necking portion 122 and the second necking portion 123; a plurality of ribs 125 are dispersed on the second necking portion 123; when the dust proof cap 1 is inserted into the front casing 2, a step platform between the first necking portion 122 and the second necking portion 123 abuts against a front end of the front casing 2, the insertion core 301 extends into the cavity 124, and the ribs 125 contact an inner side wall of the installation hole 201 of the front casing 2. By using the ribs 125 on the dust proof cap 1 that press against the inner side wall of the installation hole of the front casing 2, the dust proof cap 1 is fixed in position. The step platform between the first necking portion 122 and the second necking portion 123 limits the position of the dust proof cap 1 to prevent direct contact of the dust proof cap 1 with the insertion core 301, so that the insertion core 301 will not be interfered when inserting or removing the dust proof cap 1.

In summary, the optical fiber connector of the present invention has modified the tail rod head portion of the insertion core assembly from a hexagonal shape to a quadrilateral shape, which greatly reduces the degree of rotation of the insertion core when the insertion core assembly retracts backwardly after the insertion core assembly is inserted into the front casing, thereby greatly increasing the precision and repeatability of such insertion connection. The curved surface of the part of the tail rod head portion connecting the insertion core and the curved hole provided in the installation hole of the front casing matching the curved surface provide guiding effect when the insertion core rebounds after compression, thus ensuring that the insertion core rebounds along the same position, thereby minimizing the rotational shift of the insertion core after rebound and therefore reducing the impact of external force on the quality of connection and hence increasing the stability of the optical fiber connector and the precision of connection. Structurally, a rear casing according to the prior art is divided into two separate components in the present invention, namely the rear casing and the intermediate panel, and such modification shortens a total length of the optical fiber connector by shortening the length of the rear casing while not affecting the properties and performance of the optical fiber connector, so that the optical fiber connector is more securely fixed to its corresponding adaptor.

The above description illustrates a preferred embodiment of the present invention; the embodiment as described is not intended to limit the present invention. Any changes, modifications and replacements that achieve equivalent technical effects, made within the concept and spirit of the present invention should also fall within the scope of protection of the present invention.

What is claimed is:

1. An optical fiber connector, comprising a front casing and an insertion core assembly; the front casing comprises an installation hole where the insertion core assembly is installed; the insertion core assembly comprises an insertion core and a tail rod; the tail rod comprises a tail rod head portion and a tail rod necking portion; the tail rod head portion fixedly sleeves one end of the insertion core; the tail rod head portion has a quadrilateral cross section; a cross section of the installation hole also has a quadrilateral shape that matches the quadrilateral cross section of the tail rod head portion; a surface of the tail rod head portion facing towards the insertion core from back to front of the insertion core is a curved surface; an inner side wall of the installation hole is projected inwardly to form a curved hole having an inner surface that has a curved shape that matches the curved surface of the tail rod head portion, so that after the insertion core has passed through the curved hole, the tail rod is blocked by the curved hole; the optical fiber connector also comprises a rear casing connected with the front casing; the rear casing comprises a hollow aluminum press tube and a connecting rod that fixedly sleeves one end of the hollow aluminum press tube; the connecting rod is provided with a projected portion; the connecting rod is provided with a fastener; the front casing is provided with a lock opening; when the connecting rod is inserted into the front casing, the fastener locks into the lock opening, so as to fix the front casing and the rear casing.

2. The optical fiber connector of claim 1, wherein the optical fiber connector also comprise a sleeve tube that sleeves the tail rod necking portion, and a spring that sleeves the sleeve tube; one end of the spring abuts against the tail rod head portion, another end of the spring abuts against the hollow aluminum press tube.

3. The optical fiber connector of claim 2, wherein an inner side wall of an end of the sleeve tube connecting with the tail rod necking portion is provided with a projection; the tail rod necking portion is provided with a recessed portion; the projection is embedded to the recessed portion so as to fix the sleeve tube with respect to the tail rod necking portion.

4. The optical fiber connector of claim 1, wherein the optical fiber connector also comprises a tail sleeve and a crimp ring; the crimp ring sleeves the hollow aluminum press tube of the rear casing and the optical fiber; the tall sleeve sleeves the crimp ring and the optical fiber.

5. The optical fiber connector of claim 4, wherein a hollow rivet is provided inside the crimp ring; the hollow rivet has a through hole running through a rivet body and a rivet cap; a fiber core of the optical fiber passes through the hollow rivet from the rivet body; a periphery of the rivet cap of the hollow rivet presses against a jacket of the optical fiber so as to fix the optical fiber.

6. The optical fiber connector of claim 4, wherein the optical fiber connector also comprises an intermediate panel; a head portion of the tail sleeve is provided with a position limiting groove; the intermediate panel is provided with a protrusion corresponding to the position limiting groove and a position limiting portion corresponding to the projected portion on the connecting rod of the rear casing, so that when the intermediate panel clamps the tail sleeve and the rear casing, the intermediate panel fixes the tail sleeve and the rear casing.

7. The optical fiber connector of claim 1, wherein the optical fiber connector also comprises a dust proof cap inserted into the front casing; the dust proof cap comprises a cap body, a first necking portion and a second necking portion; a cavity is provided running through the first necking portion and the second necking portion; a plurality of ribs are dispersed on the second necking portion; when the dust proof cap is inserted into the front casing, a step platform between the first necking portion and the second necking portion abuts against a front end of the front casing, the insertion core extends into the cavity.

* * * * *